United States Patent [19]
Chatt

[11] Patent Number: 6,052,526
[45] Date of Patent: Apr. 18, 2000

[54] DATA STRUCTURE AND METHOD FOR DYNAMIC TYPE RESOLUTION USING OBJECT-ORIENTED PROGRAMMING LANGUAGE REPRESENTATION OF INFORMATION OBJECT SETS

[75] Inventor: Thomas R. Chatt, Redondo Beach, Calif.

[73] Assignee: Vertel Corporation, Woodland Hills, Calif.

[21] Appl. No.: 08/837,438

[22] Filed: Apr. 17, 1997

[51] Int. Cl.[7] .................................................. G06F 17/28
[52] U.S. Cl. .......................................................... 395/705
[58] Field of Search ................................... 395/705, 500, 395/683, 710, 200.53, 702; 707/103, 101, 100; 709/223

[56] References Cited

U.S. PATENT DOCUMENTS

| | | | |
|---|---|---|---|
| 5,261,080 | 11/1993 | Khoyi et al. | 395/500 |
| 5,291,583 | 3/1994 | Bapat | 395/500 |
| 5,421,015 | 5/1995 | Khoyi et al. | 395/677 |
| 5,542,078 | 7/1996 | Martel et al. | 707/101 |
| 5,627,979 | 5/1997 | Chang et al. | 345/335 |
| 5,694,598 | 12/1997 | Durand et al. | 707/103 |
| 5,729,739 | 3/1998 | Cantin et al. | 707/103 |
| 5,828,842 | 10/1998 | Sugauchi et al. | 395/200.53 |

*Primary Examiner*—Tod R. Swann
*Assistant Examiner*—Matthew Smithers
*Attorney, Agent, or Firm*—Loeb & Loeb LLP

[57] ABSTRACT

A data structure and method for dynamic type resolution in mapping abstract syntax notation (ASN.1) onto an object-oriented programming language (C++). For each information object class in ASN.1, two C++ classes are generating, a "set class" that models information object sets in that ASN.1 class, and a "class class" that models information objects in that ASN.1 class. For each information object set in an ASN.1 module class, a C++ data member is defined and a virtual resolve method is generated that may be invoked during the decoding process to permit dynamic extension of each information object set. A coder environment is provided in C++ that has pointers to instances of the various C++ module classes, enabling selective control of the type resolution information presented to the decoder.

18 Claims, 4 Drawing Sheets

DATA STRUCTURE AND METHOD FOR DYNAMIC TYPE RESOLUTION USING OBJECT-ORIENTED PROGRAMMING LANGUAGE REPRESENTATION OF INFORMATION OBJECT SETS

FIELD OF THE INVENTION

The invention relates generally to the field of Open Systems Interconnection (OSI) data communications software, and more particularly, to a data structure and method for resolving dynamic type using object-oriented programming language representation of information object sets.

BACKGROUND OF THE INVENTION

The International Telecommunications Union (ITU, formerly the CCITT) and the International Organization for Standardization (ISO) have promulgated a series of joint recommendations to standardize a seven-layer Open Systems Interconnection (OSI) protocol model that permits the communication of application data between heterogeneous computers in a uniform manner. The seven layers comprise a physical layer, a data link layer, a network layer, a transport layer, a session layer, a presentation layer, and an application layer.

These recommendations include the specification of Abstract Syntax Notation One (ASN.1), a standardized notation for describing application layer data structures. (ASN.1 is documented in ISO 8824 | CCITT Rec. X.208, later revised in ISO 8824-1 and ITU-T Recs. X.680 through X.683.) ASN.1 provides a notation for specifying the syntax of information to be passed between two systems that communicate within the OSI model. The gist of ASN.1 is to define data structures in a machine-independent form to facilitate communication between computing systems that have different hardware platforms, different operating systems and different communications software. These data structures include definitions of "types" and "values", which describe various structural and functional attributes of the data.

One powerful feature One of the type definition in ASN.1 is the ability to define a variant type, one whose actual definition is not determined until runtime. The specification of the variant type is left open, and is constrained to be one of several alternatives to be selected at runtime according to a mapping of values onto types, indexed by some contextual value. This is accomplished in a predictable manner by specifying one component of a constructed type as a discriminator whose runtime value is used as a key to interpreting the variant component of the constructed type. In the 1990 version of ASN.1, the variant type was denoted by the notation ANY DEFINED BY. This allowed the variant type to express its dependence on the value of some other specified component, but did not provide complete information about how to map values of the discriminator onto the appropriate type information to finally resolve the variant type.

This problem was solved in the revised ASN.1 standard issued in 1994, which replaced the ANY DEFINED BY notation by categories of information objects, information object sets, and information object classes. The combination of these with new subtype constraint notations offered a complete and flexible method for specifying variant types, their relation to discriminators, and the resolution information.

More particularly, the 1994 version introduced the concept of an information object, a new entity used to associate a particular value (typically an OBJECT IDENTIFIER or INTEGER) with a type. A collection of such information objects is called an information object set, which is analogous to a table where each row is an information object. The structure of the table (the "schema" in this analogy) is defined by an information object class. Information object sets provide the means to decode open types by mapping the value of some known component in the PDU being decoded onto the type information needed to decode an "open" component. The contents of an information object set may be statically defined or dynamically provided (or a combination of both).

The solution to handling variant types in the theoretical notation in ASN.1 created a need for effectively modeling the notation in an actual programming language. The types and values in ASN.1 may be mapped straightforwardly onto classes and instances in an object-oriented programming language, such as C++; however, there was no obvious method for mapping information objects, object sets, and object classes of the abstract syntax onto an object-oriented language. This problem stood in the way of devising compilers that would automatically map or convert ASN.1 syntax into C++ or another object-oriented programming language.

This problem was complicated by the fact that the information object sets may be extended at runtime and often contain no predetermined type resolution information. Thus, not only is the resolution of a variant type postponed until runtime, but the definition of the type resolution information may also be negotiated at runtime. Moreover, the same type resolution information (i.e., the same information object set) may be negotiated differently in different communications contexts. At a minimum, only the structure of the type resolution information is predetermined.

Consequently, there is a need for a data structure and method for mapping variant type information onto an object-oriented programming language that: (1) uses a straightforward mapping from ASN.1 information object sets; (2) models the information object sets such their values may be examined and extended where applicable; (3) allows multiple instances of the same information object set to support different communication contexts in the same application while providing a type-safe interface for initializing and updating information object set instances; (4) provides an interface for passing a "context" to an encoder/decoder which identifies information object set instances; (5) avoids solutions that require runtime writeable global variables (thread safety); and (6) provides a method for dynamically extending the variant type resolution information on an "as needed" basis during the process of decoding.

There is no current data structure or method that satisfies the above requirements. In particular, none are able to the support multiple communications contexts that require more than one instance of the same information object set.

SUMMARY OF THE INVENTION

The present invention solves the above-mentioned problems by generating two programming language classes for each information object class in the ASN.1 source input. The first programming language class (the "class class") represents the information object class. Instances of this programming language class represent information objects of that information object class. The second programming language class (the "set class") models sets of the information object class. Instances of this programming language class represent information object sets of that information object class.

It is an object of the present invention to generate an instance of the "set class" for a particular information object set in the ASN.1 source as a data member contained within some enclosing class in the programming language. The enclosing class may be instantiated, resulting in an instance of each of the information object sets being instantiated. By instantiating the enclosing class multiple times, multiple instances of the same information object sets may be created to support different communication contexts.

It is another object of the present invention to generate in the same enclosing class a virtual method to be invoked during the decoding process, allowing just-in-time dynamic extension of the information object sets.

It is further object of the present invention to provide a convenient container class to collect multiple instances of these enclosing classes for presenting the dynamic type resolution information to the protocol data unit (PDU) decoding function.

BRIEF DESCRIPTION OF THE DRAWINGS

The several features and advantages of the present invention will be better understood from a reading of the following detailed description in conjunction with the drawings, in which.

DETAILED DESCRIPTION OF THE INVENTION

Figure 1:
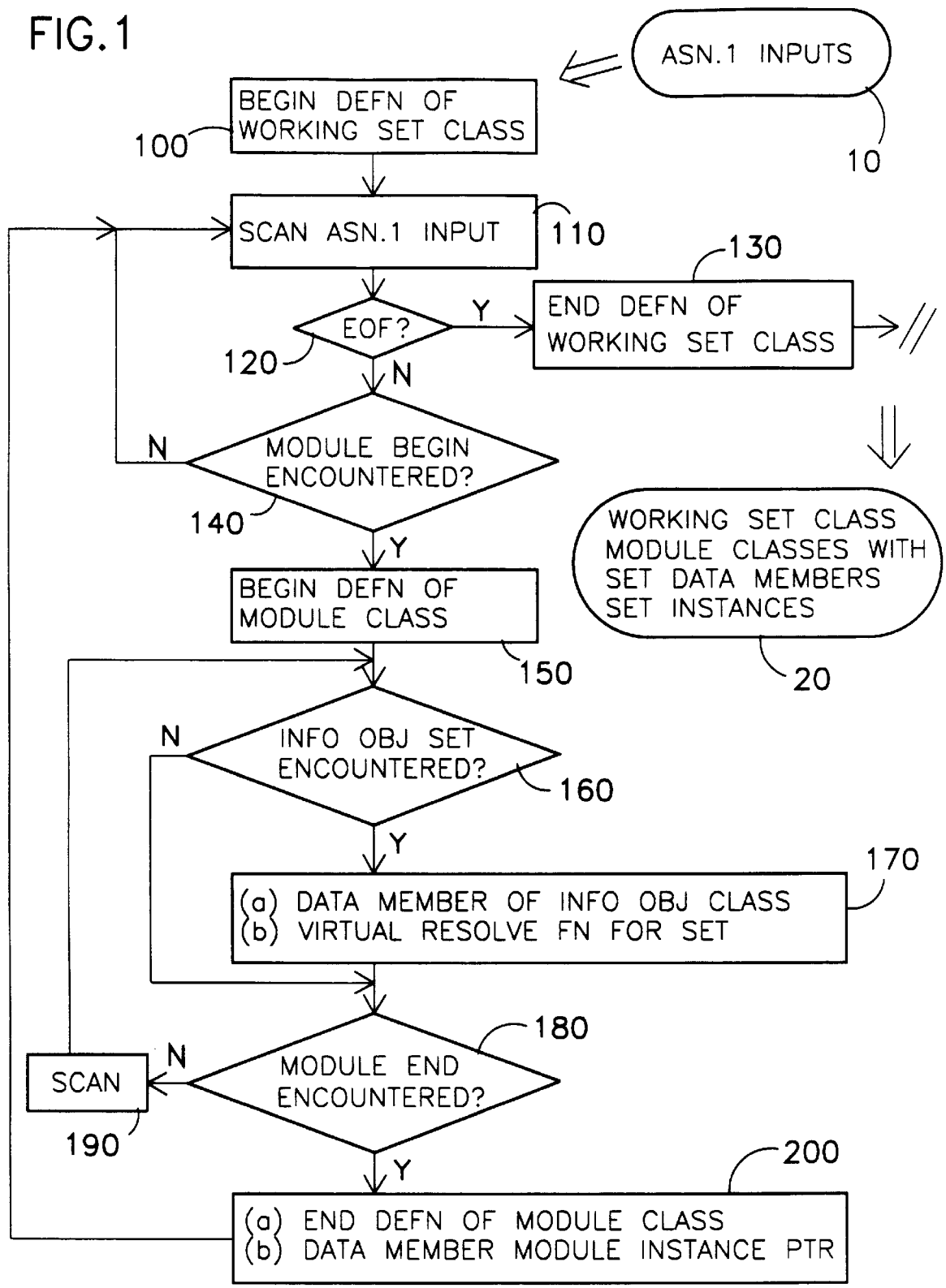
FIG. 1 shows a flow chart the mapping of information object sets and their enclosing modules and working set onto their object-oriented language representations.

The four drawings are flow charts that describe the process for mapping the ASN.1 source code into the object-oriented programming language. The text that follows will include specific examples of source code for the preferred embodiment that uses C++ as the destination programming language. Identical reference numerals in the drawings denote the same elements throughout the various drawings.

It should be noted that while flow charts are used here to illustrate the procedural steps in the invention, the nature and primary purpose of object-oriented programming is to describe and define data structures and functions as objects without regard to specific procedural steps. The order that such data structures and described and defined is often irrelevant. However, flow charts are used here to show an actual step-by-step procedure of the mapping of the present invention. The description to follow will first track a set of steps in the various flow charts in generalized terms, then provide more specific examples of ASN.1 and C++ code with a more detailed description of that particular set of steps.

Turning now to FIG. 1, the first steps of the preferred embodiment of the present invention to map information object sets in the ASN.1 source onto data members in C++ that are enclosed in classes organized by an ASN.1 module. The entire compiler pass is enclosed in a class called a "working set", which may be given a name by the user. The input for this process is ASN.1 source definitions or inputs (10). The process begins by generating the beginning part of a working set class (100). The ASN.1 input is scanned (110) until the end of input is reached (120), when the end of the working set class is generated (130).

The working set comprises a collection of ASN.1 modules that form a complete and coherent definition of message formats to be exchanged. For the purposes of the present invention, the C++ class that represents the working set contains the data members that represent the information object sets. The C++ WorkingSet class may also contain metadata information associated with its modules, as described in NMF-040, "ASN.1/C++ Application Programming Interface," Issue 1.0, Draft 10A, Network Management Forum, Aug. 21, 1996. An application may make use of one or more working sets.

A pro forma abstract base class for working sets in C++ is provided below

```
class ASN1::WorkingSet
{
    public:
        virtual ~WorkingSet();
        virtual WorkingSet* clone() = 0;
        virtual const WorkingSet* clone() const = 0;
    protected:
        WorkingSet();
        WorkingSet( const WorkingSet& );
        WorkingSet& operator= ( const WorkingSet& );
};
```

The generated C++ class inherits from the abstract base class "ASN1::WorkingSet". The abstract base class is empty, existing only to provide a common base to keep all heterogeneous working set classes and specific working set subclass instances in a single container. The public methods of the base class are limited to its destructor and a pure virtual "clone" method to be provide by subclasses. The protected methods include the construct and copy functions so that the class can only be instantiated using a subclass.

For working set class 100, there is one or more module classes 150 that are in turn defined. For each line of ASN.1 source code scanned (110), if end of file (120) is not detected, the source code is checked (140) to detect for the syntax for the beginning of a module. If not, then the next line of source code is scanned (110). If module begin syntax is detected (140), then the beginning of a module class in C++ is generated (150).

If an information object set is encountered (160) in the ASN.1 source code, then two steps are performed (170). First, a data member is created of the information object class (170(*a*)); second a virtual resolve function is created for the set (170(*b*)).

Next, the ASN.1 source code syntax is checked to determine if it indicates the end of the module (180). If not, the next line of the ASN.1 input is scanned (190) and the process repeats by detecting if the input line contains an information object set (160). If module end syntax is detected (180), the process ends by defining the end of the module class (200(*a*)) and by generating a data member whose type is a pointer to an instance of the particular module class that was just generated (200(*b*)).

A pro forma abstract base class for modules in C++ is provided below:

```
class ASN1::Module
{
public:
    virtual ~Module();
    virtual Module* clone() = 0;
    virtual const Module* clone() const = 0;
protected:
    Module();
    Module( const Module& );
    Module& operator= ( const Module& );
};
```

This module class is similar to the pro forma abstract base class for working sets as described above, and has the same features and attributes. In particular, it is an abstract base class enabling specific module subclass instances to be stored in a common container. Again, for convenience, the same module name is used in the C++ code as in the ASN.1 source code.

The following detailed example will further illustrate how working sets and modules are mapped from abstract syntax notation onto object-oriented programming language. The following abstract syntax (ASN.1) source code has one working set with two modules:

```
--<WorkingSet MyWorkingSet MyModule1,MyModule2>--
MyModule1 {1 2 3 4 1} DEFINITIONS ::= BEGIN
    SomeTbl SOME_TBL ::= {...}
END
MyModule2 {1 2 3 4 2} DEFINITIONS ::= BEGIN
END
```

Note that the syntax "::=BEGIN" is used to detect the beginning of the particular module (140), and that the syntax "END" is used to detect the end of that module (180). The line "SomeTbl SOME_TBL ::={ . . . }" is an example of an information object set. (The precise syntax of an information object set is described in X.682. The distinguishing convention is an initially capitalized token "SomeTbl", which names the set. This is followed by an entirely capitalized token "SOME_TBL", which names the information object class that defines the structure of its elements. Finally, this is followed by the "::=". The ellipsis indicates that this information object set is dynamically extensible.)

This abstract syntax is converted using the process shown in FIG. 1 into the following C++ source code:

```
class MyWorkingSet : public ASN1::WorkingSet
{
public:
    // standard construct/copy/destroy
    MyWorkingSet ( ) ;
    MyWorkingSet ( const MyWorkingSet& ) ;
    MyWorkingSet& operator= ( const MyWorkingSet& );
    virtual ~MyWorkingSet ( ) ;
    virtual WorkingSet* clone ( ) ;
    virtual const WorkingSet* clone ( ) const;
    // one class for each module
    class MyModule1 : public ASN1::Module
    {
    public:
        // standard construct/copy/destroy
        MyModule1( ) ;
        virtual ~MyModule1 ( ) ;
        MyModule1( const MyModule1& ) ;
        MyModule1& operator=( const MyModule1& ) ;
```

-continued

```
        virtual Module* clone ( ) ;
        virtual const Module* clone ( ) const;
        // any information object sets go here
        // as public data elements
        SOME_TBL SomeTbl;
        virtual bool resolve_SomeTbl(SOME_TBL&
someTbl,
                                        const
SOME_TBL::key_type& key,
                                        ASN1::CoderEnv*
env)
            { return false; }
    };
    class MyModule2 : public ASN1::Module
    {
    public:
        // standard construct/copy/destroy
        MyModule2 ( ) ;
        ~MyModule2 ( ) ;
        MyModule2( const MyModule2& ) ;
        MyModule2& operator=( const MyModule2& );
        virtual Module* clone ( ) ;
        virtual const Module* clone ( ) const;
    };
    // constructor with modules provided
    MyWorkingSet ( MyModule1*, MyModule2* );
    // one public data element for each module
    MyModule1* const myModule1;
    MyModule2* const myModule2;
};
```

Note that lines beginning with "//" are comment lines provided solely to aid the reader in understanding the functional aspects of each section of code.

The result of this mapping from ASN.1 to C++ is to generate for each module in a working set a working set class that contains a nested C++ class that represents the module and contains instances of any information objects sets defined in that module.

In the above C++ code, the first class defined is "class MyWorkingSet", which encloses all classes generated in this compiler pass. This is generated by begin definition of working set class 100, as shown in FIG. 1. Much of this is standard boilerplate C++ code for defining basic attributes of a C++ class and is well known to those skilled in the art.

The next class corresponds to the first module, "class MyModule1". This code is generated by begin definition of module class 150. After the preliminary methods are defined for the standard construct, copy and destroy features, the information object set "SOME_TBL" is defined, as generated by process 170. For each information object set, a type-safe virtual callback function is defined within the nested C++ class for the module (the second step in process 170). The callback is to be invoked by the decoder when it searches an information object set and cannot find a particular key, providing the opportunity to dynamically extend the information object set and to supply the wanted key. The name of the callback function is resolve_<ioset>" where "<ioset>" is the name of the information object set associated with the callback. The arguments to the callback include the information object set, the key which was not found, and the CoderEnv.

The generated working set class contains one instance of each module class defined within it. The public interface to these instances is through const pointer public data members. This mechanism allows the working set class to be subclassed by the user, and to instantiate subclasses of the module classes. This is how a user would provide callback functionality.

The next class in the above C++ code corresponds to "MyModule2" in the ASN.1 code, which does not include any information object sets. That class, "class MyModule2", thus contains the standard construct, copy and destroy features without the data member and virtual resolve for "class MyModule1" that corresponds to the information object set in that module and resulting C++ class.

Finally, the last two groups of C++ code above correspond to end definition of working set class 130. It contains a constructor with the two modules provided, and one public data element for each module.

Figure 2:
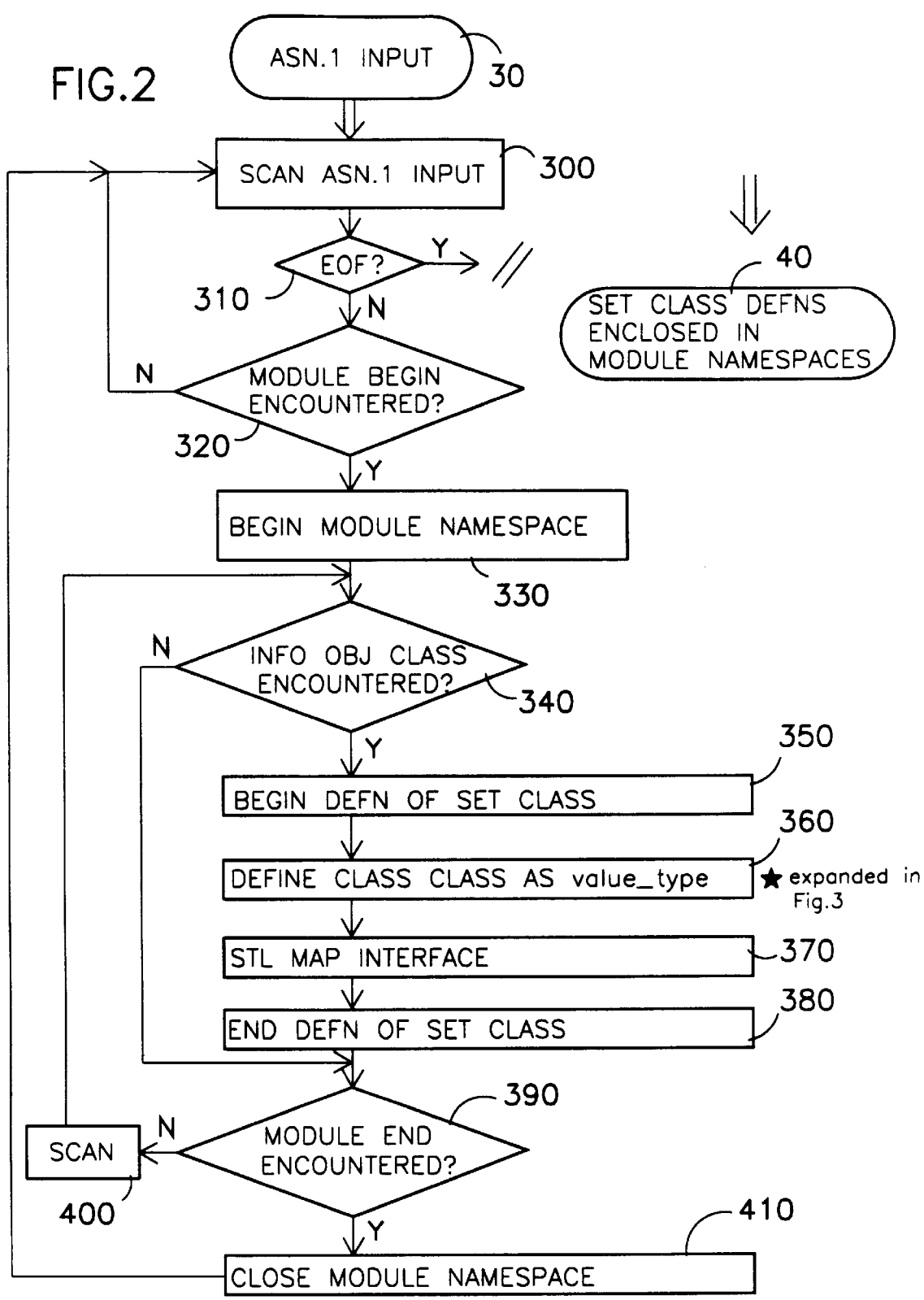
FIG. 2 shows a flow chart of the mapping of each information object class onto two object-oriented programming language classes to represent information objects and information object sets of that information object class.

FIG. 2 shows the procedure for mapping information object classes in abstract syntax notation into the object-oriented programming language. For each information object class in abstract syntax, two classes are generated in the object-oriented programming language. One class represents information objects of that information object class; the other represents information object sets of that information object class. In C++, the latter is a Standard Template Library (STL) container class whose name is the same as the information object set, while the former is "value_type" within the scope of the container class, since it represents an element of the container. (STL is provided by ANSI/C++ programming language.)

As shown in FIG. 2, ASN.1 input 30 is scanned (300) line by line until the end of file is detected (310), indicating the end of the source code. For each line of code, the source code is checked (320) to determine if the line contains the appropriate syntax designating the beginning of a module (i.e., "::=BEGIN"). If not, the process continues and another line of ASN.1 input 30 is scanned (300); if so, a namespace is opened (330) for the class using the same name used in the ASN.1 module.

Next, if an information object class is detected (340) in the ASN.1 source code, the following tasks are performed. First, a set class definition is begun (350) in C++. Second, a class class is defined in C++ as a value_type (360), which is more fully described in FIG. 3. Third, a standard STL set interface is created (370). Fourth, the set class definition is ended (380), closing the C++ class.

After these tasks are performed, or if no information object class is detected (340), the ASN.1 module is checked (390) to the module has ended. If so, the namespace module is closed (410) and the final "};" is inserted in the C++ code; otherwise, the next line of ASN.1 input is scanned (400) to determine if an information object class is detected (340), and the proces is continued for each information object class in the module.

Figure 3:
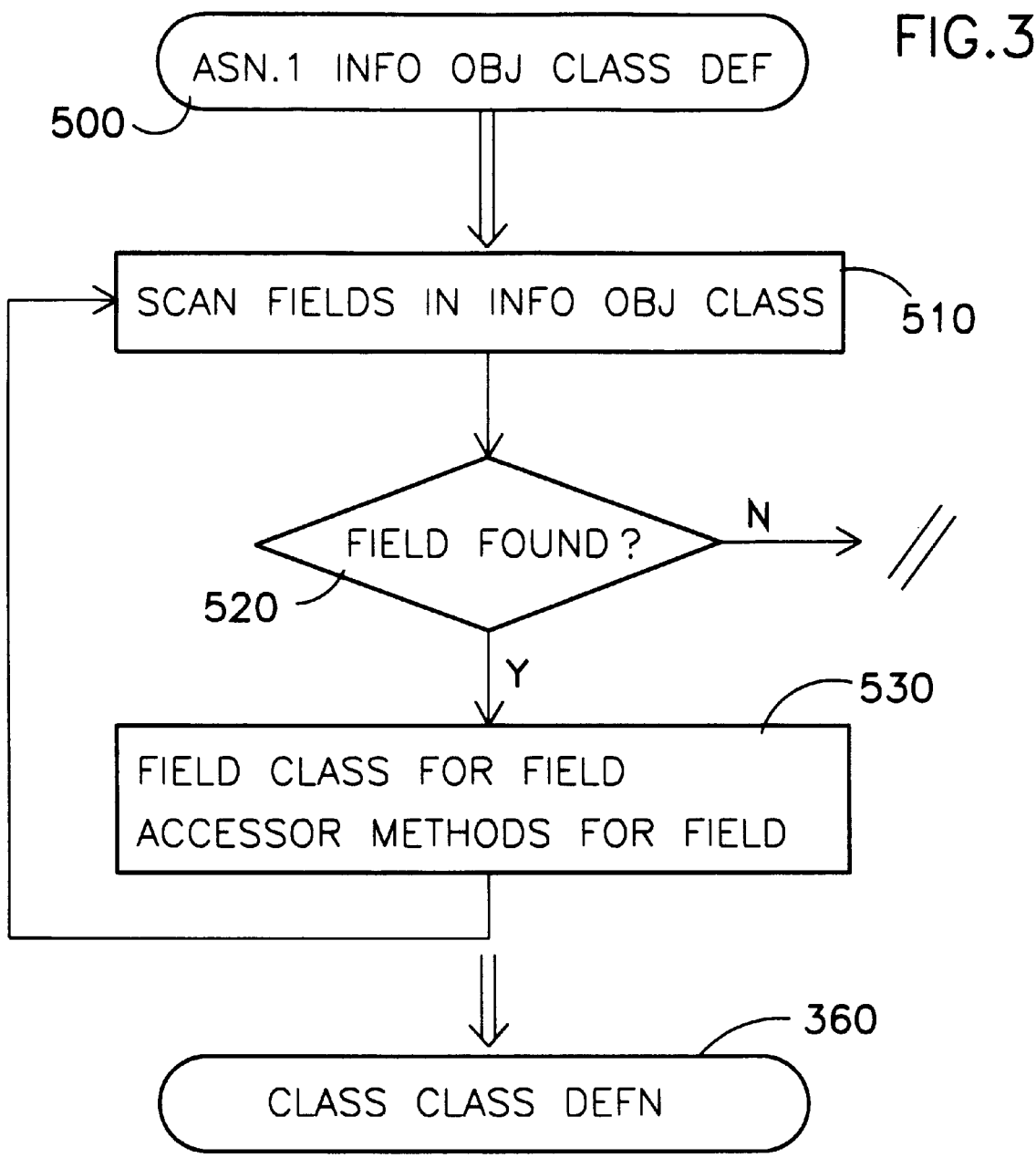
FIG. 3 shows a flow chart that expands upon the step of defining the "class class" as a value type in the flow chart in FIG. 2.

The third task of defining the class class for an information object set is described in greater detail in FIG. 3. An information object class in ASN.1 is defined in C++ as a class value_type (500). Next, the next line of the abstract syntax source code is scanned (510) to search for fields in each line of code—each field representing a separate component in the structure of the information object class. For each field detected (520), a separate class in C++ is created (530) with appropriate type definitions, and accessor methods are created (530) for each field. These steps define class class (360) in FIG. 2.

An example of the process of mapping abstract syntax of information object classes more particularly illustrates the steps shown in the flow charts of FIGS. 2–3. The C++ classes generated from abstract base classes inherit from two pro forma base classes, one for information objects and another for information object sets. The pro forma base classes are as shown below:

```
//
// Pro forma abstract base class for information objects
//
namespace ASN1 {
    class InfoObject
    {
    public:
    virtual ~InfoObject ( ) ;
    virtual InfoObject* clone ( ) = 0;
    virtual const InfoObject* clone ( ) const = 0;
    friend bool operator== ( const InfoObject&, const InfoObject&
};
    friend bool operator< ( const InfoObject&, const InfoObject& );
    protected:
    InfoObject ( ) ;
    InfoObject( const InfoObject& );
    InfoObject& operator= ( constInfoObject& );
        };
};
//
// Pro forma abstract base class for information object sets
//
    namespace ASN1 {
        class InfoObjectSet
        {
        public:
    virtual ~InfoObjectSet ( ) ;
    virtual InfoObjectSet* clone ( ) = 0;
    virtual const InfoObjectSet* clone ( ) const = 0;
    friend bool operator== ( const InfoObjectSet&, const
InfoObjectSet& );
    friend bool operator< ( const InfoObjectSet&, const
InfoObjectSet& );
        protected;
        InfoObjectSet ( ) ;
        InfoObjectSet( const InfoObjectSet& );
        InfoObjectSet& operator= ( const InfoObjectSet& );
        };
            };
```

These two classes are abstract to allow specific information object subclass instances and specific information object set subclass instances, respectively, to be stored in a common container. The only public methods of the base classes are their destructor and a pure virtual "clone" method to be provided by subclasses. The protected methods include the construct and copy enabling the class to be abstract and to permit only subclasses to be instantiated.

The abstract syntax in ASN.1 for a particular module containing an information object class called MY-CLASS having two fields, "id" and "Type", is shown below:

```
MyModule1 {1 2 3 4 1} DEFINITIONS ::= BEGIN
    MY-CLASS ::= CLASS {
        &id INTEGER UNIQUE,
        &Type
    }
    END
```

The precise syntax of information object classes is specified in X.682, but roughly speaking, the "::=" token and "CLASS" keyword introduce the definition of an information object class named by the preceding token (e.g., "MY_CLASS"), with the definition that follows enclosed in braces. Each field in the information object class definition is indicated by an initial ampersand '&' followed by the field name. A comma-separated list of fields is contained within the braces. Each of these syntaxes is respectively used by detect information object class 340 in FIG. 2 and field detector 520 in FIG. 3.

The above ASN.1 syntax is converted or mapped into the following C++ code:

```
namespace MyModule {
    class MY_CLASS : public ASN1::InfoObjectSet {
    typedef ASN1_Integer key_type;
    class value_type : public ASN1::InfoObject {
        class id {
        typedef ASN1::Integer value_type;
        typedef value_type& reference;
        typedef const value_type& const_reference;
        typedef value_type* pointer;
        typedef const value_type* const_pointer;
        };
        class Type {
        typedef ASN1::Type* value_type;
        typedef value_type& reference;
        typedef const value_type& const_reference;
        typedef value_type* pointer;
        typedef const value_type* const_pointer;
        };
        id::const_reference get_id( ) const;
        id::reference ref_id( ) ;
        id::reference set_id( const id::value_type& );
        Type::const_reference get_Type( ) const;
        Type::reference ref_Type ( );
        Type::reference set_Type( const Type::value_type&
    };
    };
    typedef value_type& reference;
    typedef const value_type& const_reference;
    typedef value_type* iterator;
    typedef const value_type* const_iterator;
    typedef size_t size_type;
    //
    // standard STL map interface
    //
    MY_CLASS ( ) ;
    MY_CLASS( const MY_CLASS& that );
    MY_CLASSS& operator= ( const MY_CLASS& that ) ;
    virtual ~MY_CLASS( ) ;
    const_iterator begin( ) const;
    const_iterator end( ) const;
    iterator begin( ) ;
    iterator end( ) ;
    bool empty( ) const;
    size_type size( ) const;
    size_type max_size( ) const;
    const value_type& operator[ ] ( const key_type& )
    const;
    value_type& operator[ ] ( const key_type& );
    iterator insert( iterator, const_reference x ) ;
    void insert( const_iterator q1, const_iterator q2 );
    iterator insert( const_reference x ) ;
    size_type erase( const key_type& key ) ;
    void erase( iterator q ) ;
    void erase( iterator first, iterator last ) ;
    const_iterator find( const key_type& key ) const;
    iterator find( const key_type& key ) ;
    size_type count( const key_type& key ) const;
    const_iterator lower_bound( const key_type& key )
    const;
    iterator lower_bound( const key_type& key );
    const_iterator upper_bound( const key_type& key )
    const;
    iterator upper_bound( const key_type& key ) ;
    const_iterator equal_range( const key_type& key );
    const;
    iterator equal_range( const key_type& key ) ;
    friend bool operator== ( const MY_CLASS&, const
    MY_CLASS& ) ;
    friend bool operator< ( const MY_CLASS&, const
    MY_CLASS& ) ;
    };
    };
```

As we track the conversion of the ASN.1 syntax to C++ code along with the flow charts in FIGS. 2–3, we see that module begin detector 320 detects the "::=BEGIN" in the first line of the ASN.1 code, and begin module namespace 330 generates "namespace MyModule" in the first line of the C++ code.

Within the scope of the namespace, we generate a C++ class named "MY_CLASS" to model information object sets of the information object class MY-CLASS. The interface for this "set class" will conform to the STL map interface. The first element of this class, in accordance with the STL map convention, is the key_type. The type used for the key_type is based on the ASN.1 type of the field marked "UNIQUE" in the definition of the information object class being modeled. This is generated by begin definition of set class 350 in FIG. 2. The next element of the set class is the value_type, where we generate an inline nested class definition to model information objects of this information object class (the "class class"). This is generated by define class class 360, as shown in FIGS. 2–3.

The class class contains scope classes and accessor methods for each field in the definition of the information object class being modeled. The name of each scope class is the name of the corresponding field in the information object class definition, and the accessor method names are related to the field name in a standard manner, preceding "get_" "set_", and "ref_" as appropriate. In the example shown here, the scope classes are named "id" and "Type", and the accessor methods are named "get_id", "ref_id", "set_id", "get_Type", and so forth. This process detailed in FIG. 3 is more fully explained in NMF-040, and will be understood by those skilled in the art.

After the value_type class generation is complete, STL map interface 370 in FIG. 2 generates the remainder of the standard STL map interface based on the key_type and value_type. These lines are the five immediately above the comments lines reading "standard STL map interface", and all lines that follow (with the exception of the final close module namespace bracket "};" generated by close module namespace 410).

Figure 4:
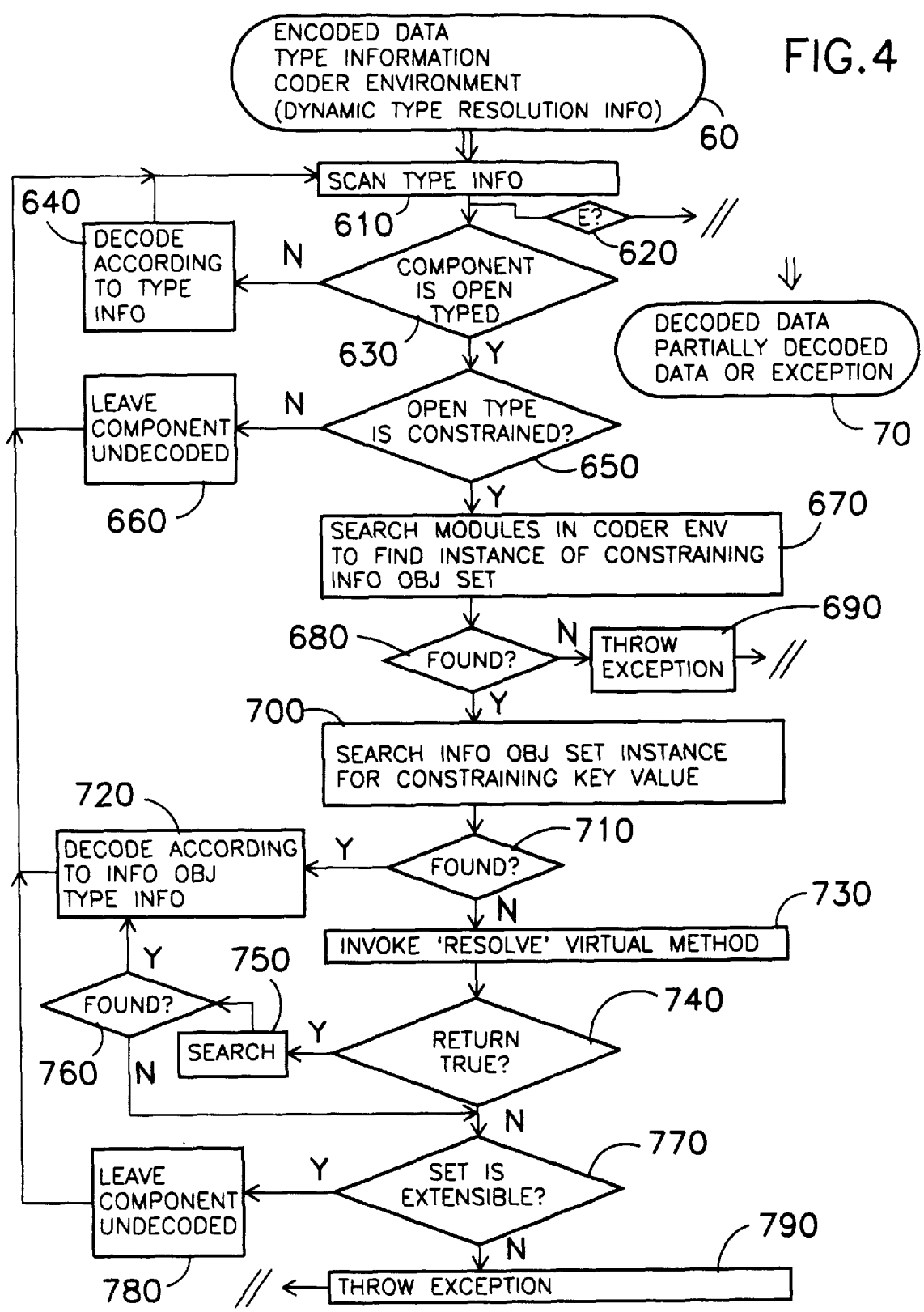
FIG. 4 shows a flow chart of the application of dynamic type resolution information in the decoding process.

The process for decoding the data and type information, and in particular the dynamic type resolution information, within the OSI protocol requirements is shown in FIG. 4. Encoded data 600 is scanned (610) until the end of file is detected (620). Each subsequent data type component is checked to determine if is an "open" data type (630). If not, then the data component is decoded (640) in accordance with the predetermined type information, and the next data type information is scanned (610) and the process continued.

If the data component is an open type, it is further checked to determine if it is constrained (650). If the open type is not constrained, or if deferred decoding has been specified, the data type is simply skipped over (660) and left in an undecoded buffer. If the open data type is constrained, the modules in the coder environment are searched (670) to find the particular constraining information object set for that constrained open data type. If no constraining information object set is available in the coder environment, an exception is thrown (690).

If the open type is constrained and the information object set is found in the coder environment, then that information object set is searched (700) to determine if there is a constraining key value in the information object set. If a key value is found, the data type component is decoded (720) in accordance with the type resolution associated with that key, and the next data type component is scanned (610). If no key value is found in the information object set, the "resolve" virtual method or callback (730) is invoked.

If the resolve virtual method returns a true value (740), then the information object set is searched again (750) to determine if the key value has been added by the callback (760). If the desired key is now found, the data type component is decoded (720) in accordance with the key value and the associated type resolution information. If the callback returns a false value (740), or if the desired key is still not found after the callback (730), then the information object set is checked (770) to determine if it is extensible. If the set is not extensible, an exception is returned (790). If the set is extensible, then the data type component is left undecoded (780). Otherwise, an exception is thrown (790).

In order for an application to conveniently manage the dynamic type resolution information contained in module class instances, a "coder environment" class "CoderEnv" is introduced that serves as a container of module pointers. The container offers the standard STL set interface, with a few convenience methods added (for example, to insert entire working sets into the container). The element of the container is a module pointer rather than a module instance, allowing the class to contain subclasses of module, allowing the module instances to be modified after being inserted into the CoderEnv, and allowing one module instance to be shared among several CoderEnv instances.

The coder environment is the means by which particular instances of dynamic type resolution information are made available to the decoding function. The coder environment class may be subclassed, with instances of the subclass passed to the coding services functions. This is particularly useful if the coding services invoke user callbacks, allowing the coder environment instance to be passed to those callbacks. Adding subclasses further enables the user to add his own context information that would then be available within user callbacks from the coding services.

The definition of the coding environment class in C++ is provided below:

```
class ASN1::CoderEnv {
public:
    //
    // STL set<ASN1::Module*> interface
    //
    typedef ASN1::Module* key_type;
    typedef ASN1::Module* value_type;
    typedef value_type& reference;
    typedef const value_type& const_reference;
    typedef value_type* pointer;
    typedef const value_type* const_pointer;
    CoderEnv( );
    CoderEnv( const CoderEnv& that );
    CoderEnv& operator=( const CoderEnv& that );
    virtual ~CoderEnv( );
    const_iterator begin( ) const;
    const_iterator end( ) const;
    iterator begin( );
    iterator end( );
    bool empty( ) const;
    size_type size( ) const;
    size_type max_size( ) const;
    iterator insert( const value_type& val ) :
    iterator insert( iterator, const value_type& val ) ;
    void insert( const_iterator q1, const_iterators q2 );
    size_type erase( const value_type& val ) ;
    void erase( iterator q ) ;
    void erase( iterator first, iterator last ) ;
    const_iterator find( const value_type& val ) const;
    iterator find( const value_type& val ) ;
    size_type count( const value_type* val ) const;
    const_iterator lower_bound( const value_type& val ) const;
    iterator lower_bound( const value_type& val ) ;
    const_iterator upper_bound( const value_type& val ) const;
    iterator upper_bound( const value_type& val ) ;
    const_iterator equal_range( const value_type& val ) const;
```

-continued

```
    iterator equal_range( const value_type& val ) ;
    friend bool operator==( const CoderEnv&, const CoderEnv& ) ;
    friend bool operator<( const CoderEnv&, const CoderEnv& ) ;
    //
    // also allow insertion via a WorkingSet
    //
    iterator insert( const ASN1::WorkingSet* val ) ;
    //
    // PDUInfoSet information object set as public data
    //
    PDUINFO_PDUInfoSet;
};
```

Note that the value_type of the set in the ASN1::CoderEnv class is an ASN1::Module pointer, and not an instance. Although this requires the user to manage the memory for each module instance, module instances may be easily modifiable even after it has been inserted into a CoderEnv instance. Also, it affords the API user the flexibility of sharing module instances between several CoderEnv instances if it is useful. The coder environment has other features not directly related to this invention, and is more fully explained in NMF-040.

The preferred embodiment of the present invention uses an octet iterator template interface for encoding and decoding for communication with a remote entity, as described in NMF-040.

While the preferred embodiment uses C++ as the object-oriented programming language, other object-oriented programming languages may alternately be used.

Additional advantages and modifications will readily occur to those skilled in the art. Thus while the preferred embodiment of the present invention has been disclosed and described herein, the invention in its broader aspects is not limited to the specific details, methods and representative devices shown and described herein. It will be understood by those skilled in the art that various changes in form and detail may be made therein without departing from the spirit and scope of the general inventive concept as defined by the appended claims and their equivalents.

What is claimed is:

1. A method for mapping abstract syntax notation onto an object-oriented programming language comprising the steps of:

generating a class class in the object-oriented programming language that corresponds to and models each information object in the abstract syntax notation, the information object representing dynamically extensible type resolution information; and generating a set class in the object-oriented programming language that corresponds to and models each information object set in the abstract syntax notation, the information object set containing at least one information object.

2. The method according to claim 1 in which the object-oriented programming language is C++.

3. The method according to claim 2 further comprising the step of presenting a Standard Template Library (STL) interface for each set class.

4. The method according to claim 3 further comprising the step of defining the class class inline as the value_type of the set class.

5. The method of claim 1, wherein the abstract syntax notation is Abstract Syntax Notation One which describes application layer data structures in data communications systems.

6. A compiled code in an object-oriented programming language that is translated from abstract syntax notation comprising:

a class class in the object-oriented programming language that corresponds to and models each information object in the abstract syntax notation, the information object representing dynamically extensible type resolution information; and a set class in the object-oriented programming language that corresponds to and models each information object set in the abstract syntax notation, the information object set containing at least one information object.

7. The compiled code according to claim 6 in which the object-oriented programming language is C++.

8. The compiled code according to claim 7 further comprising a Standard Template Library (STL) interface for each set class.

9. The compiled code according to claim 8 in which the class class is defined inline as the value_type of the set class.

10. The compiled code of claim 6, wherein the abstract syntax notation is Abstract Syntax Notation One which describes application layer data structures in data communications systems.

11. A method for mapping abstract syntax notation onto an object-oriented programming language comprising the steps of:

defining a module class in the object-oriented programming language for a module in the abstract syntax notation, the module defining at least one information object set which represents dynamically extensible type resolution information;

detecting information object sets in each line of the abstract syntax notation; and creating a data member in the module class for each information object set detected.

12. The method according to claim 11 further comprising the step of defining a virtual resolve method in the module class for each information object set detected in the abstract syntax notation.

13. The method according to claim 12 wherein the virtual resolve method permits the dynamic extension of each information object set.

14. The method according to claim 13 in which the object-oriented programming language is C++.

15. The method according to claim 13 further comprising the step of creating a container class in the object-oriented programming language that contains multiple instances of the module classes such that dynamic type resolution information may be presented to a protocol data unit decoding function.

16. The method according to claim 15 wherein the step of creating the container class further includes creating pointers to instances of the various object-oriented programming language module classes, enabling selective control of the type resolution information that may be presented to a decoder.

17. The method according to claim 16 in which the object-oriented programming language is C++.

18. The method of claim 11, wherein the abstract syntax notation is Abstract Syntax Notation One which describes application layer data structures in data communications systems.

* * * * *